(12) United States Patent
Sun et al.

(10) Patent No.: US 11,847,823 B2
(45) Date of Patent: Dec. 19, 2023

(54) OBJECT AND KEYPOINT DETECTION SYSTEM WITH LOW SPATIAL JITTER, LOW LATENCY AND LOW POWER USAGE

(71) Applicant: Apple Inc., Cupertino, CA (US)

(72) Inventors: Xiaoxia Sun, Cupertino, CA (US); Jiefu Zhai, San Jose, CA (US); Ke Zhang, San Jose, CA (US); Xiaosong Zhou, Campbell, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 196 days.

(21) Appl. No.: 17/339,249

(22) Filed: Jun. 4, 2021

(65) Prior Publication Data

US 2021/0397826 A1     Dec. 23, 2021

Related U.S. Application Data

(60) Provisional application No. 63/040,909, filed on Jun. 18, 2020.

(51) Int. Cl.
| | |
|---|---|
| *G06V 10/82* | (2022.01) |
| *G06T 3/40* | (2006.01) |
| *G06V 40/20* | (2022.01) |
| *G06V 20/40* | (2022.01) |
| *G06N 3/045* | (2023.01) |
| *G06V 10/25* | (2022.01) |
| *G06V 20/20* | (2022.01) |
| *G06V 40/10* | (2022.01) |
| *G06V 20/20* | (2022.01); *G06V 20/46* (2022.01); *G06V 40/113* (2022.01); *G06V 40/28* (2022.01) |

(52) U.S. Cl.
CPC .............. *G06V 10/82* (2022.01); *G06N 3/045* (2023.01); *G06T 3/40* (2013.01); *G06V 10/25*

(58) Field of Classification Search
CPC ........ G06V 10/82; G06V 10/25; G06V 20/20; G06V 40/113; G06V 20/46; G06V 40/28; G06N 3/045; G06T 3/40
USPC ......................................................... 382/181
See application file for complete search history.

(56) References Cited

U.S. PATENT DOCUMENTS

| | | | |
|---|---|---|---|
| 10,929,654 B2 * | 2/2021 | Iqbal | G06N 3/08 |
| 11,074,711 B1 * | 7/2021 | Akbas | G06V 10/454 |
| 2018/0204111 A1 | 7/2018 | Zadeh et al. | |
| 2019/0362183 A1 * | 11/2019 | Thiebaut | G06T 7/20 |
| 2020/0250462 A1 | 8/2020 | Yang et al. | |

FOREIGN PATENT DOCUMENTS

| | | |
|---|---|---|
| CN | 111079695 A | 4/2020 |
| CN | 111126272 A | 5/2020 |
| CN | 111160269 A | 5/2020 |
| KR | 2016-0034275 A | 3/2016 |
| KR | 2020-0065033 A | 6/2020 |

* cited by examiner

*Primary Examiner* — Michael R Neff
(74) *Attorney, Agent, or Firm* — BakerHostetler (57) ABSTRACT

Video object and keypoint location detection techniques are presented. The system includes a detection system for generation locations of an object's keypoints along with probabilities associated with the locations, and a stability system for stabilizing keypoint locations of the detected objects. In some aspects, the generated probabilities are two-dimensional array correspond locations within input images, and stability system fits the generated probabilities to a two-dimensional probability distribution function.

18 Claims, 5 Drawing Sheets

OBJECT AND KEYPOINT DETECTION SYSTEM WITH LOW SPATIAL JITTER, LOW LATENCY AND LOW POWER USAGE

CLAIM FOR PRIORITY

The present application claims priority to U.S. patent application 63/040,909, filed Jun. 18, 2020, and entitled "Object and Keypoint Detection System with Low Spatial Jitter, Low Latency and Low Power Usage," the disclosure of which is incorporated herein in its entirety.

BACKGROUND

The present disclosure relates to object and keypoint detection system and, in particular, to such systems that are robust to spatial jitter.

Many modern video applications, such as augmented related, virtual reality, and other modern systems for human-user interaction, require detection and location of common objects. However, existing techniques for object detection and location tends to require many processing resources and power, especially when applied in real-time or when higher reliability and stability is required. Such techniques, therefore, may find limited application in processing environments where processing resources are limited, such as mobile computing devices that may have fewer processing resources comparatively to other computing platforms.

DETAILED DESCRIPTION

Techniques disclosed include detecting a predetermined object from content of input video including generating data representing coordinates of the input video in which the predetermined object is estimated to be present and respective estimated probabilities of the predetermined object at the coordinates. A final location of the predetermined object may be assigned by fitting the estimated probabilities of the predetermined object at the coordinates to a probability distribution function.

In aspects, detecting the predetermined object may include detecting coordinates of predetermined keypoints of the object according to a neural network. The neural network may include a plurality of neural network elements and a plurality of stability modules connected in cascade of alternating stages. The stability elements may include a random noise source, a scaler to normalize neural element outputs from a preceding stage to a magnitude of the random noise source, and an adder having inputs coupled to the random noise source and the scaler.

In an aspect, the predetermined object may be a human hand. The detecting may include detecting keypoints of the human hand and detecting a gesture of the human hand by classifying final detected locations of the hand over time to predetermined gesture patterns. In an aspect, a keypoint detection system may distinguish hand "chirality," that is, whether the predetermined objects represent the left hand of a human subject or the right hand of the human subject. The keypoint detection system may identify and distinguish other elements having chirality characteristics—content objects that may have mirrored counterparts elsewhere in the image content.

Figure 1:
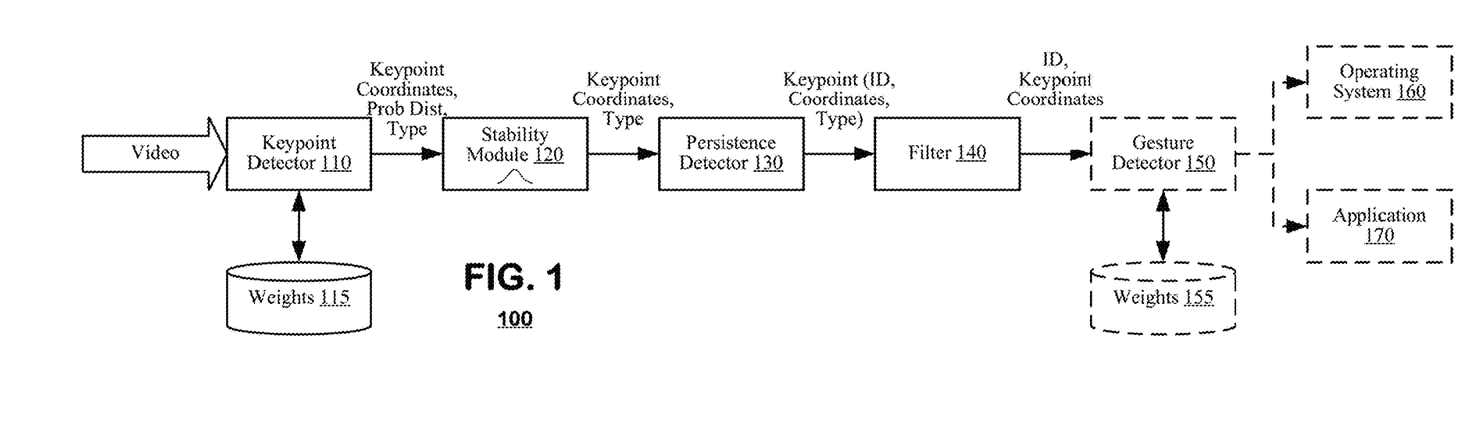
FIG. 1 illustrates a system according to an aspect of the present disclosure.

The present disclosure presents a keypoint detection system for objects and their associated keypoints that overcomes many limitations found in traditional systems such as:
a. Requiring a depth sensor, which induces high power usage;
b. Requiring high processing resources and exhibiting low analysis frame rate
c. Unstable detection with significant jittering of keypoints
d. High latency due to both low frame rate and adoption of additional temporal smoothness filter FIG. 1 illustrates a system 100 according to an aspect of the present disclosure. The system 100 may include a keypoint detector 110, a stability module 120, a persistence detector 130, and a filter system 140. The system 100 may accept an input video sequence, which may be provided by a camera system or retrieved from storage (not shown) as may be convenient. The system may output data identifying a number of objects detected and coordinates of those objects over frames of the video sequence.

The keypoint detector 110 may detect predetermined objects from within image content and may output coordinates representing the location of each object so detected. The number of objects so detected may vary based on content presented in the input video sequence. The keypoint detector 110 may be embodied as a neural network system with network weights 115, obtained from training data, that determine the types of objects that the keypoint detector 110 can recognize. For example, the keypoint detector 110 may be trained to recognize human faces, human bodies, human hands, predetermined types of animals, and the like. As discussed, the keypoint detect may be trained to distinguish a left hand from a right hand of a subject in the image content. The keypoint detector 110 may output data representing coordinates and two-dimensional probability distributions of the keypoints detected from the video data. When the keypoint detector 110 is trained to recognize multiple types objects of different types (e.g., human bodies and human hands), the keypoint detector 110 also may output an identifier of the type of object so identified. In an aspect, the keypoint detector 100 may produce output for each detected object includes a list of locations corresponding to key features of the detected object.

The stability module 120 may determine final coordinate positions of keypoints from the coordinate data and probability distributions output by the keypoint detector 110. The stability module may perform curve-fitting operations to map the coordinate and probability data to expected distribution functions, such a Gaussian distribution functions or an n-order polynomial distribution function. For example, for a Gaussian function, the keypoint coordinate may be derived as the mean value of the approximated Gaussian function. In an embodiment, the stability module 120 may fit a temporal sequence of probability distributions with deterministic functions, applying relatively higher weights to distributions from more recent frames than weights to more temporally distant frames. The stability module 120 may select final locations of the keypoints from maximal values of the coordinate/probability data after mapping it to the expected distribution function.

It is expected that operation of the stability module 120 provides increased performance over other approaches that would assign keypoint locations according to their maximum estimated probabilities. Such other approaches lead to instability because they are subject to noise in the probability estimates. The stability module 120 may reduce effects of such noise characteristics by approximating each probability distribution with a deterministic smooth function, as discussed above. Moreover, the stability module 120 does not require learning of parameters and, therefore, the stability module 120 behaves in the same way during both training and testing stages of operation. For video input, the stability module 120 may fit a sequence of probability distributions with deterministic functions. The probability distributions from more recently processed video frames may be conformed to fit the deterministic function better than 'older,' more-distantly processed frames.

The persistence detector 130 may identify detected objects that are persistent within image data across consecutive frames of video. Objects may be identified as persistent when object keypoints are within a predetermined threshold distance of each other in two or more adjacent frames and, where applicable, have a common type. When objects are identified as persistent across multiple frames, the persistence detector 120 may assign an identifier (ID) to those instances of the objects and identify coordinates of the objects' keypoints within the span of frames in which they appear.

The filter 140 may apply temporal filtering to the coordinate data representing the keypoints. The filter 140 may smooth keypoint coordinate data, which may reduce frame to frame jitter that otherwise might be observed if, for example, bounding boxes were superimposed over image data that contains the detected keypoints. The keypoint coordinates may exported to other system components, such as an operating system 150 or an application, through appropriate interfaces.

In an embodiment, the temporal filter 140 may apply filtering such as a Kalman Filter, a One-Euro filter, etc. to smooth the trajectory of object keypoints over a period of time. The temporal filter smoothest out each keypoint individually after the detected objects are collated over a sequence of frames. In practice, temporal filtering can be applied over multiple (>2) adjacent frames. The temporal filter may be enabled when acceleration of object movement is smaller than a threshold, or the temporal filter can be weighted by a function of the acceleration, so that the temporal filter does not introduce observable latency. When an object is moving with large acceleration, or has a sudden change of moving direction, the temporal smoothing filter can be de-emphasized, or disabled and the outputs from the persistence detector 130 can be used directly as system outputs.

Figure 2:
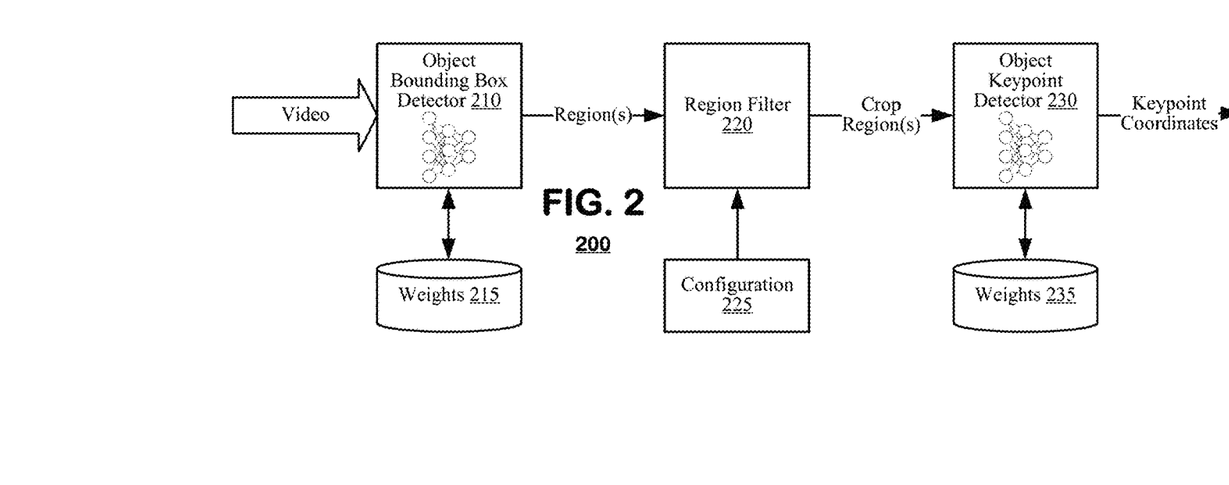
FIG. 2 is a functional block diagram of a keypoint detector according to an embodiment of the present disclosure.

FIG. 2 is a functional block diagram of a keypoint detector 200 according to an embodiment of the present disclosure. The keypoint detector 200 may include an object bounding box detector 210, a region filter 220, and an object keypoint detector 230. The keypoint detector 200 may be applied in the system 100 of FIG. 1.

The object bounding box detector 210 may detect objects of predetermined types from video content. Typically, the object bounding box detector 210 may iterate over each frame of a video sequence to recognize object(s) within image content. The object bounding box detector 210 may be embodied by a neural network and weights 215 determined from training sequences. The object bounding box detector 210 may output data identifying spatial region(s) of each frame in which predetermined objects are detected, confidence scores indicating an estimated likelihood that the regions contain the object, and, in an implementation in which multiple types of objects are detected, an object type.

As discussed, in one aspect, the object bounding box detector may detect the chirality of an object by distinguishing between two different objects that are symmetric reflections of each other. For example, if a human hand is a predetermined type of object detected, the object bounding box detector 210 may, for detected hand, distinguish a between a right hand and a left hand, and output an indication of the detected chirality of the hand.

The region filter 220 may extract image content corresponding to the regions identified by the object bounding box detector 210 and output the content to the object keypoint detector 230 as cropped regions. In an aspect, the region filter 220 may operate according to configuration settings 225 that govern, for example, how many detected objects are to be processed by the object keypoint detector 230 or which types of objects are to be processed by the object keypoint detector 230. When configuration settings 225 direct that a smaller number of regions be output to the object keypoint detector 230 than are detected by the object bounding box detector 210, the region filter 220 may select regions to be output according to their relative sizes (e.g., prioritizing larger regions over smaller regions) or according to their relative confidence scores (prioritizing regions with higher confidence scores over other regions with lower confidence scores). Configuration settings 225 may be defined by designers of the keypoint detector 200 or users that operate the keypoint detector 200, once deployed.

The object keypoint detector 230 may detect object keypoints from within image data representing detected objects. The object keypoint detector 230 may be embodied as a neural network with weights 235 that govern network operation. Object keypoints typically represent predetermined structural components of objects that the system is configured to detect. For a system that is trained to detect human bodies, keypoints may correspond to predetermined structural elements of the human body, such as locations of joints within the body (wrists, elbows, shoulders, hips, knees, ankles and the like), the top of the head, the chin, etc. For a system that is trained to detect human faces, keypoints may correspond to predetermined structural elements of the human face such as hairline, eyebrows, eyes, a nose, ears, lips, the chin, etc. For a system that is trained to detect human hands, keypoints may correspond to predetermined structural elements of the human hand such as the wrists, joints along each finger and the thumb, etc. The number and type of keypoint objects typically will vary based on the type of object that the system is trained to detect. The object keypoint detector 230 may output a list of the keypoint coordinates for each input crop region. The keypoint coordinates output by object keypoint detector 230 may represent the final outputs of keypoint detector 200.

Figure 3:
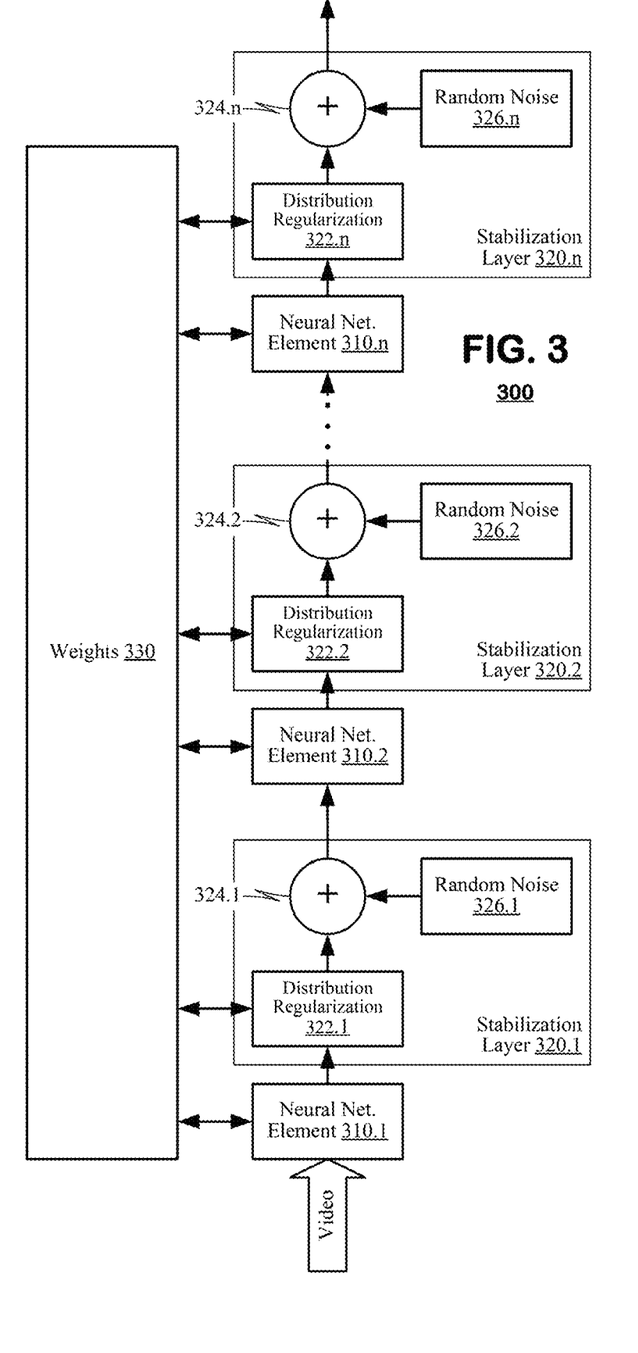
FIG. 3 illustrates a neural network system according to an embodiment of the present disclosure.

FIG. 3 illustrates a neural network system 300 according to an embodiment of the present disclosure. The neural network system 300 may include a plurality of neural network elements 310.1, 310.2, . . . , 320.*n* and stabilization layers 320.1, 320.2, . . . , 320.*n* connected in cascade. The neural network elements 310.1, 310.2, . . . , 320.*n* and stabilization layers 320.1, 320.2, . . . , 320.*n* may operate according to weights 330 established for the neural network system 300.

The stabilization layers (say layer 310.1) each may include a distribution regularization unit 322.1, an adder 324.1 and a random noise generator 326.1. The distribution regularization unit 322.1 may receive outputs from a preceding neural network element 310.1. It may normalize magnitudes of the outputs to levels commensurate with levels of noise generated by the random noise generator 326.1. The adder 324.1 may add outputs of the distribution regularization unit 322.1 and the random noise generator 326.1 and output the aggregate outputs the next layer of neural network elements (element 310.2 in the case of stabilization layer 320.1). For the final stabilization layer 320.*n*, the outputs of the adder 324.*n* may become final outputs of the neural network system 300.

As discussed, the neural network elements 310.1, 310.2, . . . , 320.*n* and stabilization layers 320.1, 320.2, . . . , 320.*n* may operate according to weights 330 established for the neural network system 300. The neural network system 300 may be trained according to training video data input to the first neural network 300 and to an expected output to be observed from the final stabilization layer 320.*n* when the system 300 operates as desired. Weights 330 within the system 300 may be adjusted when undesirable outputs are observed from the system 300 until the system 300 converges on the desired operation. Thereafter, the system 300 may be used in runtime scenarios on newly generated video.

The architecture illustrated in FIG. 3 may be applied as the neural network of the object bounding box detector 210 and also as the neural network of the object keypoint detector 230 illustrated in FIG. 2. For an object bounding box detector 210, the system 300 may possess weights 330 derived from training the system 300 according to object detection processes. The network 300 may take multiple adjacent video frames as the input, i.e., by looking back at multiple frames during real-time analysis, fuse adjacent frames in the network 300 and predict a bounding box based on the sequence of previous frames. Similarly, for a keypoint detector 230, the system 300 may possess weights 330 derived from training the system 300 according to keypoint detection processes. The network 300 may take multiple adjacent video frames as the input, i.e., by looking back at multiple frames during real-time analysis, and predict keypoint locations based on the sequence of previous frames. By looking back at previous frames, the network may be able to reduce the noise captured in each frame and produce more temporally smooth and accurate results.

The stabilization layers 320.1, 320.2, . . . , 320.*n* may reduce keypoint jitter for the neural network system 300. Keypoint jitter may arise from small perturbations of the input image, e.g., camera sensor noise, slight changes in orientation of object in a camera's field of view, small/subtle camera motion, etc. When the input image is slightly changed, the latent features of ordinary neural networks can be exhibit drastic changes and cause jitter in the output of keypoint locations from neural network-based detection systems.

During training, a distribution regularization block (such as 322.1) may learn a transformation that regularizes the input (output from previous layer) with a specified distribution. The distribution is chosen not to overwhelm the added noise. The optimal type and energy of the noise may be selected via cross validation. The network may exploit the neighborhood of the latent features and learn to output the same latent features even if the inputs are changed by the added noise.

The architecture of FIG. 3 avoids jitter issues by normalizing distribution of latent features recognized by elements within the neural network such that the latent feature outputs do not overwhelm noise from the random noise generator 326.1, 326.2, . . . , 326.*n*. The added noise can follow any desirable distribution, such as Gaussian noise and Laplacian noise. As such, each stabilization module 320.1, 320.2, . . . , 320.*n* can increase network's robustness toward the perturbations. When the input is a sequence of frames, the stabilization module can further improve the network stability over temporal noise (jitter).

In one embodiment, a stabilization layer (such as 320.1) may takes an output from a corresponding previous neural network element (such as 310.1) as its input. The input passes through a distribution regularization block (such as 322.1). The output of the distribution regularization block may be directly taken as the output to the next layer. In this embodiment, No noise is added to the output of the distribution regularization block.

It is expected that the stabilization techniques employed in the architecture of FIG. 3 will provide advantages over other techniques that inject noise directly into outputs of neural network elements. Applications that directly inject noise into latent features oftentimes can be overcome during training by neural networks that "cheat" the added noise by learning to generate latent features with large SNR (signal to noise ratio) to overwhelm the added noise. Moreover, use of a denoising autoencoder, which adds Gaussian noise on input image, does not mimic the variations introduced by slight hand pose changes relative to the camera which leads to sub-optimal training that does not reduce keypoint jitter. The stabilization techniques proposed above, however, add random noise on latent features of multiple hidden layers which permits a network to exploit the neighborhood of these latent features and improve the networks' smoothness over these neighborhoods.

The stabilization layers discussed in FIG. 3 provide a general approach for stabilizing latent features recognized by neural network systems and improving the latent feature robustness towards noise. Therefore, the stabilization layers can be employed in other applications, such as object detection and human body keypoint detection.

Figure 4:
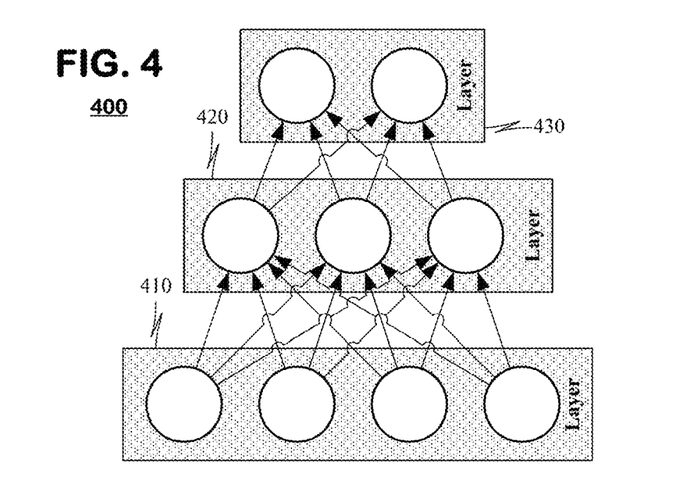
FIGS. 4 and 5 illustrate exemplary distributions of network elements in a neural network system.
Figure 5:
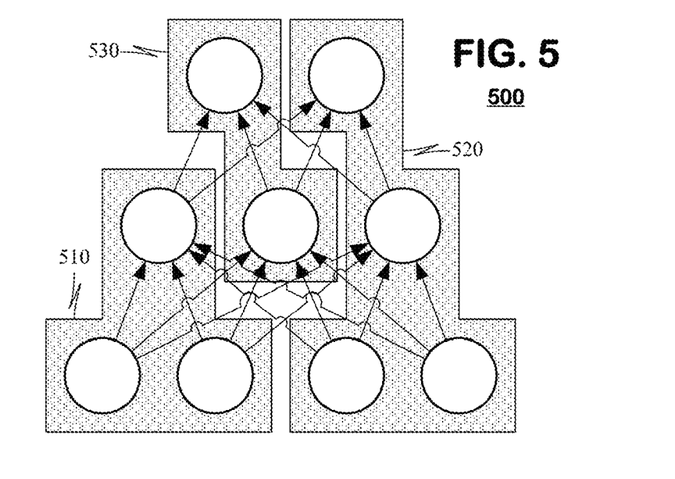

As discussed, the neural network elements 310.1, 310.2, . . . , 310.*n* may correspond to predetermined elements of a neural network. Neural networks often are modeled as a plurality of neurons that are organized into layers as shown schematically in FIG. 4. In one implementation, the neural network elements 310.1, 310.2, . . . , 310.*n* may be selected to correspond to these layers 410-430. In other aspect, shown schematically in FIG. 5, the neural network elements 310.1, 310.2, . . . , 310.*n* may be selected to correspond to groups of neurons 510-530 according to other selection protocols such as, for example, latent features that individual neurons are tasked to identify. The selection of neural network elements 310.1, 310.2, . . . , 310.*n* from a neural network may be made to suit individual application needs.

Figure 6:
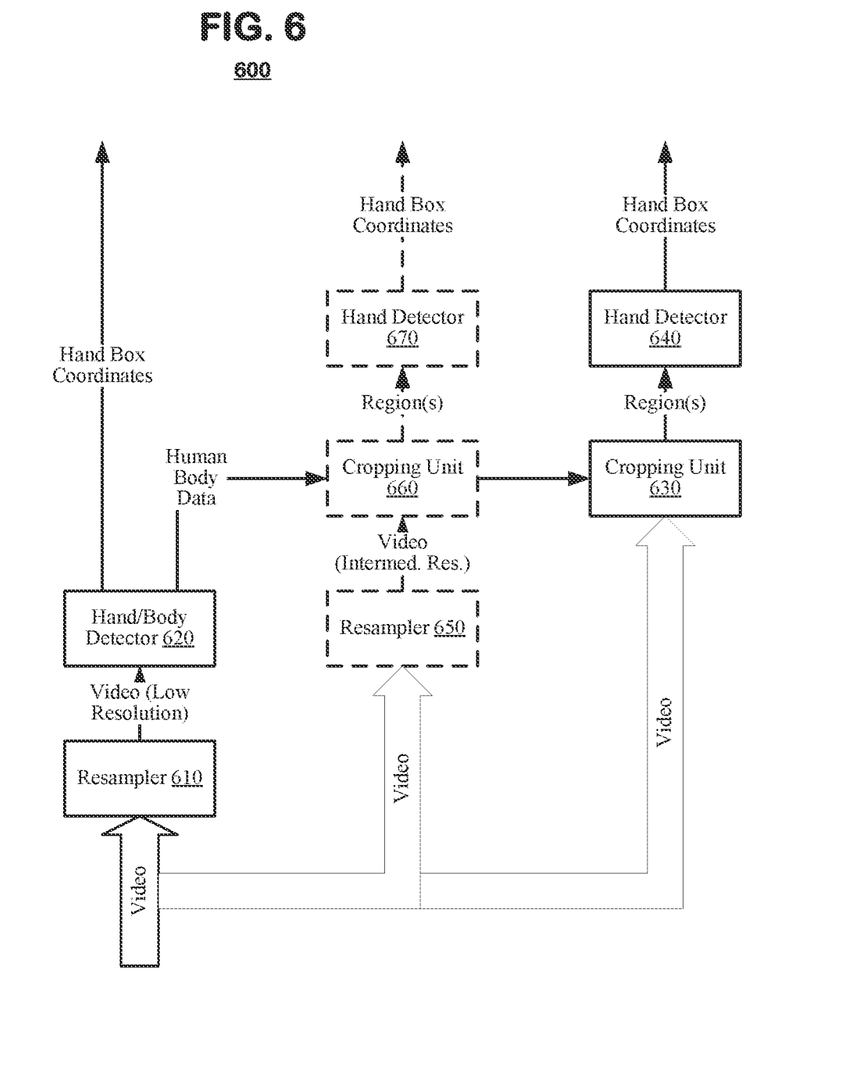
FIG. 6 is a functional block diagram of a hand detection system according to an aspect of the present disclosure.

FIG. 6 is a functional block diagram of a hand detection system 600 according to an aspect of the present disclosure. The object detector 600 may include a resampler 610, a hand/body detector 620, a cropping unit 630, and a hand detector 640. The system 600 may be applied as an object bounding box detector 210 (FIG. 2) adapted to detect locations of human hands within input video. The hand detector may take a video sequence as input.

The resampler 610 may generate a low-resolution representation of input video and output it to a hand/body detector 620. As its name implies, the hand/body detector 620 may generate data identifying location(s) of human hands or human bodies detected within the low-resolution video. The hand/body detector 620 may be a neural network object detector configured with weights representing hand detection and body detection classification training.

When the hand/body detector 620 detects hand(s) in the low-resolution representation of video, the hand/body detector 620 may output coordinates of bounding box(es) representing locations in the image data in which the hand(s) were detected. The coordinates may be scaled to represent coordinates of the bounding boxes in the original video input to object detector 600, which may have higher resolution than the reduced-resolution video input to hand/body detector 620.

It may occur that the hand/body detector 620 detects the presence of human bodies in the low-resolution representation of the video, but it does not detect the presence of human hands. Such operation may occur when hands are represented in the input video, but they have a relatively small size which prevents the hands from being detected in the low-resolution representation of video. The hand/body detector 620 may output to the cropping unit 630 data identifying location(s) of human bodies detected within image data.

The cropping unit 630 may crop source video data in the regions of the detected human bodies allowing for margins for additional image data surrounding the bounding box locations of the bodies. The cropped regions generated by the cropping unit 630 may be output to a hand detector 640, another neural network trained to detect human hands. The hand detector 640 may generate output data identifying coordinates of image data in which human hands are detected. As with the hand/body detector 620, coordinates of human hands may be scaled to represent locations within the source video in which the human hands are detected.

Optionally, the cropping unit 630 may include a lightweight hand detector (not shown) that is configured to detect human hands on a coarse basis within regions identified by the hand/body detector 620. Lightweight hand detection may be applied to conserve processing resources that otherwise might be spent by the hand detector 640 to analyze all image data in regions identified by the hand/body detector 620 (after cropping). If the lightweight hand detection does not identify the presence of human hands for a given region, then the processing of the hand detector 640 may be omitted for the respective region.

Operations of the cropping unit 630 and hand detection 640 may be repeated at different resolutions of image data as may be desired. FIG. 6, for example, illustrates a second resampler 650, a second cropping unit 660, and a second hand detector 670. The second resampler may generate a representation of the input video at an intermediate resolution that is higher than the low-resolution representation generated by the first resampler 610 but lower than a resolution of the source video. In this embodiment, hand detection may be performed first by the hand detector 620 that operates on a low-resolution representation of the input video, which is likely to recognize hands that are relatively large within video content. Hand detection may be performed second by the hand detector 670 that operates on an intermediate-resolution representation of the input video, which is likely to recognize hands that have a medium size within video content. Hand detection may be performed third by the hand detector 640 that operates on the full-resolution representation of the input video, which is likely to recognize hands that have a small size within video content, as compared to the sizes recognized by the other hand detectors 620, 670. In an embodiment, hand detection may be performed at all resolutions of image data to detect the maximal number of hands possible. Alternatively, hand detection may be performed in stages, operating first on low resolution video, second on intermediate-resolution video and, finally, on full-resolution video until a predetermined number of hands are detected. And, of course, additional stages of hand detection may be performed, beyond the three stages illustrated in FIG. 6 as may be desired.

In one embodiment, the system of FIG. 1 may be applied to recognize human hands. A hand detection system 200 may take an input video sequence and fuse the frames' information. The object bounding box detector 210 may output one or more bounding boxes for a most recent frame, and the region filter 220 may collate object regions based on interaction of unions (IoU) of the object regions. A keypoint detector 230 may take a sequence of collated hand regions that are accumulated over recent period of frames as an input and may output coordinates of object keypoints in a two-dimensional plane of the image, assigning each hand an ID that is consistent over time. The keypoint detector 230 keypoint detector may consist of a neural network trained to detect a predetermined number of keypoint locations per object. For example, a keypoint detector for a human hand may detect 21 joints in a hand region image.

Techniques above for video may also be used for processing of a single still image. For example, the system 200 of FIG. 2 may take a single image as input to detect hands the single image. Object bounding box detector may processes the input image and produce a hand region for each detected hand in the image. A Region Filter then may output cropped images of a fixed number of the largest detected hands, where the fixed number is a user specified configuration. Each selected cropped image of a hand region may then feed into a keypoint detector which consists of a deep neural network trained to detect 21 hand joints given each hand region image. The keypoint detector outputs the keypoint coordinates for input hand region. The keypoint coordinates may be the final outputs of the still image system.

Detection of human hands and keypoints within video content gives rise to a variety of applications. In a first application, illustrated in FIG. 1, keypoints of hand locations may be input to a gesture detector 150 that operates according to training weights 155 that cause the gesture detector 150 to classify hand movement according to predetermined patterns. In one embodiment, the gesture patterns may represent a sign language, such as American Sign Language, British Sign Language, Australian Sign Language, and the like, which may form a basis for operators to input data into a computer. Words or letters of the sign language may be input to an application 170 of a computer system as textual input. Alternatively, the gesture patterns may represent command input to an operating system 160 or application 170 of a computer device, which when detected may be input to the operating system 160 or application 170 as corresponding commands. Interfaces to application may be made through Application Program Interfaces of the device on which the system is implemented.

Figure 7:
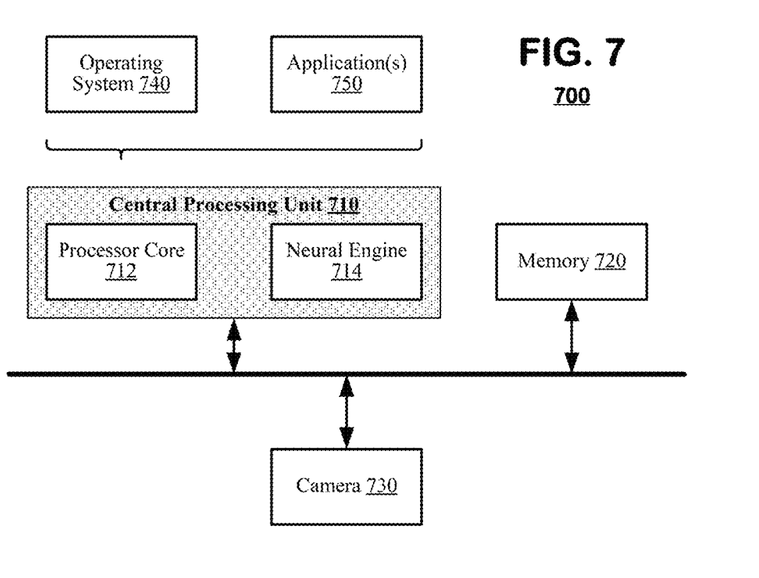
FIG. 7 is a block diagram of a device according to an embodiment of the present disclosure.

FIG. 7 is a block diagram of a device 700 according to an embodiment of the present disclosure. The device 700 may include a central processing unit 710, a memory system 720 and one or more input/output devices 730. The central processing unit 710 may include a processing core 712 and a neural engine 714, an integrated circuit that implements the neural networks discussed in the foregoing figures. The memory system 720 may store program instructions representing an operating system 740 and application(s) 750 executed by the processor core 712, weight data representing weights that are applied by the neural engine 714, and optionally video data representing archived video to be processed. The memory system 720 may be embodied by one or more memory devices embodied in electrical-, magnetic- and/or optical storage media. The input/output devices 730 may include a camera that captures video data representing a local environment and may include other controls and displays (not shown) through which operators interface with the device 700. The device 700 may be implemented by a variety of consumer electronic devices such as notebook computers, tablet computers, smartphones, gaming equipment and other devices.

The architecture illustrated in FIG. 7 may provide several advantages:

a. It may consume relatively low power when using RGB video inputs and running on a hardware neural engine. b. It may perform low latency processing due to usage of stabilization modules, network architecture, quantization of the network model, and/or a hardware neural engine.

c. It may perform stable object recognition with low jitter of keypoints due to usage of video-based object detection and keypoint detection networks (such as hand detection networks) and/or stabilization modules.

d. It may apply temporal trajectory estimation/smoothing strategies while managing perceived latency, which may provide further stability during operation.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A system, comprising:
an object detection system having an input for video and an output for data representing coordinates of an object recognized by the object detection system and estimated probabilities at such coordinates, the object detection system including a neural network element with associated weights and a stability layer, the stability layer having:
a random noise source,
a scaler to normalize an output from the neural element to a magnitude of the random noise source, and
an adder having inputs coupled to the random noise source and the scaler; and
a stability module having an input for the coordinate and estimated probability data output by the object detection system, and an output for a final estimated coordinate of the detected object, the final estimated coordinate derived from a curve-fitting technique applied to the coordinate and estimated probability data of the detected object.

2. The system of claim 1, wherein the object detection system comprises:
an object detector embodied as a first neural network and associated first weights, the object detector detecting regions of the input video representing content of a predetermined object;
a keypoint detector embodied as a second neural network and associated second weights, the keypoint detector detecting locations in the input video representing content of predetermined object keypoints of the predetermined object.

3. The system of claim 2, wherein the object detector comprises:
a plurality of neural network elements and a plurality of stability elements connected in cascade, the stability elements comprising:
a random noise source,
a scaler to normalize neural element outputs from a preceding stage to a magnitude of the random noise source, and
an adder having inputs coupled to the random noise source and the scaler.

4. The system of claim 2, wherein the keypoint detector comprises:
a plurality of neural network elements and a plurality of stability elements connected in cascade, the stability elements comprising:
a random noise source,
a scaler to normalize neural element outputs from a preceding stage to a magnitude of the random noise source, and
an adder having inputs coupled to the random noise source and the scaler.

5. The system of claim 1, wherein the object detection system comprises:
a resampler having an input for input video;
a hand/body detector having an output coupled to the resampler,
a cropping unit having an input coupled to the output from the hand/body detector for cropping a detected hand/body from the input video, and
a hand detector having an input coupled to an output of the cropping unit.

6. The system of claim 1, wherein the predetermined object is a human hand, and the detecting regions by the object detector comprises:
resampling the input video to a lower resolution;
performing hand/body detection on the lower resolution video;
when the hand/body detection detects a hand in the lower resolution video, outputting coordinates of the detected hand;
when the hand/body detection detects a body in the lower resolution video, performing hand detection on a region of the input video at its input resolution identified by the hand/body detection.

7. A system, comprising:
an object detection system having an input for video and an output for data representing coordinates of an object recognized by the object detection system and estimated probabilities at such coordinates, the object detection system including:
an object detector embodied as a first neural network and associated first weights, the object detector detecting regions of the input video representing content of a predetermined object, and
a keypoint detector embodied as a second neural network and associated second weights, the keypoint detector detecting locations in the input video representing content of predetermined object keypoints of the predetermined object; and
a stability module having an input for the coordinate and estimated probability data output by the object detection system, and an output for a final estimated coordinate of the detected object, the final estimated coordinate derived from a curve-fitting technique applied to the coordinate and estimated probability data of the detected object;
wherein predetermined object is a human hand, the object detector further detects a human hand, and object detection system further includes:
a gesture detector for classifying hand movement according to predetermined patterns, the gesture detector having an input for the final estimated coordinates from the stability module of predetermined keypoints of a human hand.

8. The system of claim 7, wherein the object detector further detects a chirality of the human hand.

9. A method comprising:
detecting from content of input video a predetermined object, the detecting generating data representing coordinates of the input video in which the predetermined object is estimated to be present and respective estimated probabilities of the predetermined object at the coordinates, the detecting including processing the input video with a neural network element having associated weights and stability layer, the stability layer having:
a random noise source,
a scaler to normalize an output from the neural element to a magnitude of the random noise source, and
an adder having inputs coupled to the random noise source and the scaler; and
assigning a final location of the predetermined object by fitting the estimated probabilities of the predetermined object at the coordinates to a probability distribution function.

10. The method of claim 9, wherein the detecting comprises detecting coordinates of predetermined keypoints of the object according to a neural network.

11. The method of claim 10, wherein the neural network comprises a plurality of neural network elements and a plurality of stability elements connected in an cascade of alternating stages, the stability elements comprising:
a random noise source,
a scaler to normalize neural element outputs from a preceding stage to a magnitude of the random noise source, and
an adder having inputs coupled to the random noise source and the scaler.

12. The method of claim 10, wherein predetermined object is a human hand, and the detecting further includes:
detects a chirality of a detected human hand; and
detecting a gesture by classifying final locations over time of the keypoints of a hand according to predetermined gesture patterns.

13. The method of claim 9, wherein the detecting comprises:
resampling the input video to a lower resolution;
performing hand/body detection on the lower resolution video;
when the hand/body detection detects a hand in the lower resolution video, outputting coordinates of the detected hand;
when the hand/body detection detects a body in the lower resolution video, performing hand detection on a region of the input video at its input resolution identified by the hand/body detection.

14. A non-transitory memory comprising instructions, that when executed by a processor, cause:
detecting from content of input video a predetermined object, the detecting generating data representing coordinates of the input video in which the predetermined object is estimated to be present and respective estimated probabilities of the predetermined object at the coordinates, the detecting including processing the input video with a neural network element having associated weights and stability layer, the stability layer having:
a random noise source,
a scaler to normalize an output from the neural element to a magnitude of the random noise source, and
an adder having inputs coupled to the random noise source and the scaler; and
assigning a final location of the predetermined object by fitting the estimated probabilities of the predetermined object at the coordinates to a probability distribution function.

15. The non-transitory memory of claim 14, wherein the detecting comprises detecting coordinates of predetermined keypoints of the object according to a neural network.

16. The non-transitory memory of claim 15, wherein the neural network comprises a plurality of neural network elements and a plurality of stability elements connected in cascade, the stability elements comprising:
a random noise source,
a scaler to normalize neural element outputs from a preceding stage to a magnitude of the random noise source, and
an adder having inputs coupled to the random noise source and the scaler.

17. The non-transitory memory of claim 15, wherein predetermined object is a human hand, and the detecting further includes:
detects a chirality of a detected human hand; and
detecting a gesture by classifying final locations over time of the keypoints of a hand according to predetermined gesture patterns.

18. The non-transitory memory of claim 14, wherein the detecting comprises:
resampling the input video to a lower resolution;
performing hand/body detection on the lower resolution video;
when the hand/body detection detects a hand in the lower resolution video, outputting coordinates of the detected hand;
when the hand/body detection detects a body in the lower resolution video, performing hand detection on a region of the input video at its input resolution identified by the hand/body detection.

* * * * *